July 5, 1966     E. C. KIEKHAEFER     3,259,099
ALIGNED INBOARD ENGINE SUSPENSION FOR INBOARD-OUTBOARD DRIVES
Filed June 8, 1964
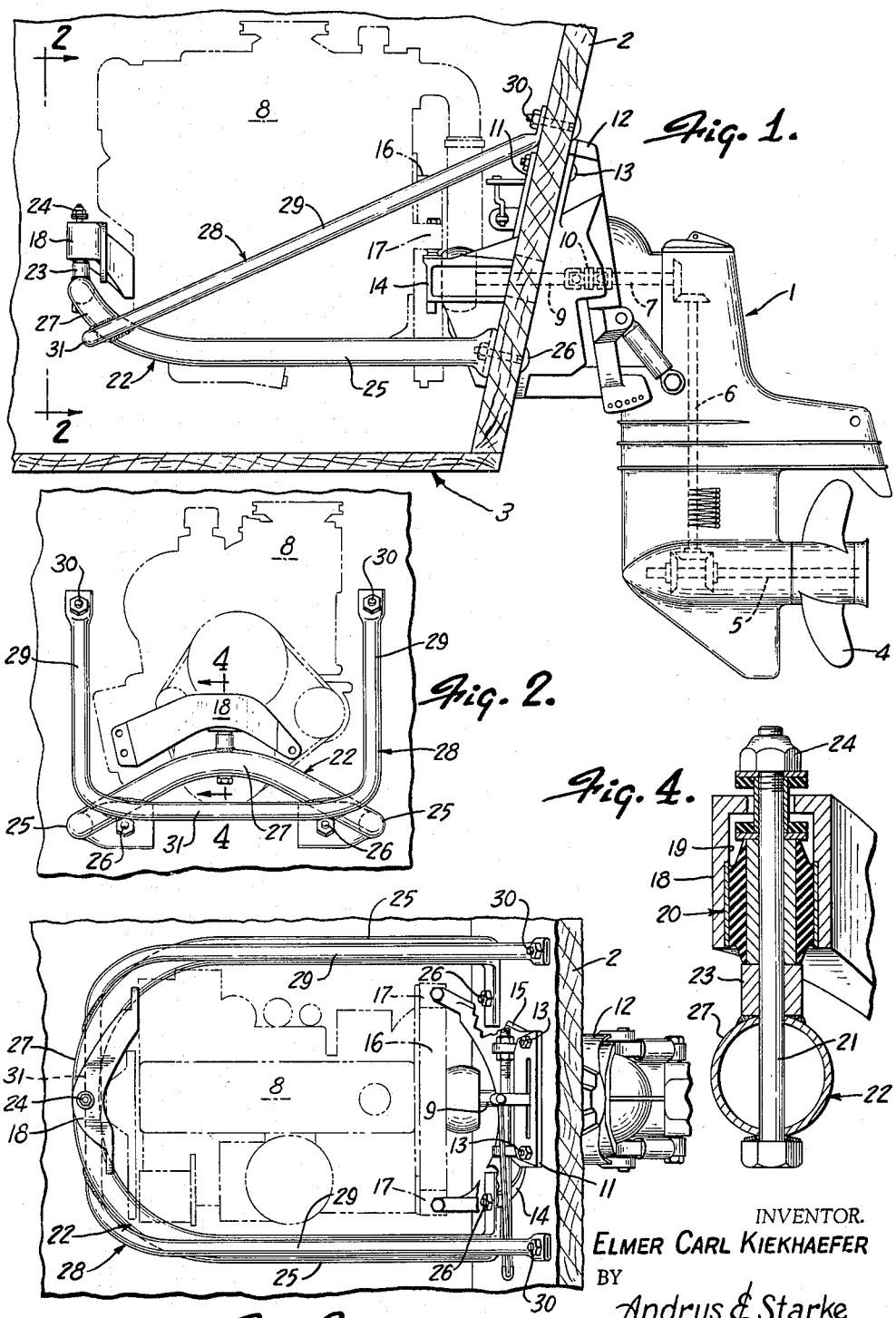
INVENTOR.
ELMER CARL KIEKHAEFER
BY Andrus & Starke
ATTORNEYS United States Patent Office 3,259,099
Patented July 5, 1966

3,259,099
ALIGNED INBOARD ENGINE SUSPENSION FOR INBOARD-OUTBOARD DRIVES
Elmer Carl Kiekhaefer, Winter Haven, Fla., assignor to Kiekhaefer Corporation, Fond du Lac, Wis., a corporation of Delaware
Filed June 8, 1964, Ser. No. 373,155
4 Claims. (Cl. 115—34)

This invention relates to an aligned inboard engine suspension for inboard-outboard drives.

More particularly, the invention constitutes an improvement over the structure disclosed in copending application Serial No. 249,725, filed January 7, 1963, entitled "Engine Suspension and Alignment for Inboard-Outboard Drives," and assigned by the present inventor with a co-inventor to a common assignee. The disclosure of that application is incorporated herein by reference.

Generally, in co-pending application Serial No. 249,725, the inboard engine is suspended on resilient mounts by a three-point mounting system. Two of the points comprise a pair of transversely spaced rear engine mounts which straddle the engine's roll axis. The transom plate assembly which establishes the mounting position of the stern drive unit includes support means for the pair of rear engine mounts which upon installation provide restraint on the engine against vertical, transverse and longitudinal movement relative to the said assembly. In addition, the engine is restrained by the rear mount in respect to rotation about the vertical and longitudinal axes intersecting midway between and on a line joining the geometric centers of the rear mounts.

The third point of suspension is disposed at the front of the engine and, according to co-pending application Serial No. 249,725, comprises a centrally located vertically adjustable mount supported above the boat floor by one of the boat cross-braces.

Further, in that application, the engine roll axis is defined as the axis of least inertia passing through the center of gravity and about which an engine will naturally oscillate or roll during operation unless otherwise restrained.

In some instances, boats are not provided with a cross brace located at the desirable position for support of the front engine mount. While such a brace could be specially installed for the particular purpose of supporting the front mount, this procedure would add little to the structural rigidity of a boat designed without it, and would merely add to the cost of a stern drive installation.

The present invention solves the aforementioned problem and eliminates the need for a floor-mounted front engine support in a three-point inboard engine support system. Generally in accordance with one aspect of the invention, the inboard engine is provided with a three-point suspension, as in the identified co-pending application. The single front suspension, however, is mounted to the transom rather than to the floor so that the entire engine is carried by the transom.

More specifically, one aspect of the invention contemplates mounting the forward part of the engine on a generally horizontal support which is secured to the lower portion of the transom and which extends forwardly beneath the engine. The support is further secured by a brace extending between the forward support end and the transom. The brace is preferably of the stirrup type, for purposes to be described.

The accompanying drawings illustrate the best mode presently contemplated by the inventor for carrying out the invention.

In the drawings:

FIGURE 1 is a side elevation of an inboard-outboard drive for a boat and incorporating the concept of the invention, with some parts shown schematically;

FIG. 2 is a front end elevation of the drive taken on line 2—2 of FIGURE 1 and showing the front engine support means;

FIG. 3 is a top plan view of the drive; and

FIG. 4 is a section taken on line 4—4 of FIG. 2.

As shown in the drawings, the inboard-outboard drive includes an outboard stern drive propulsion unit 1 mounted on the inclined transom 2 of a boat or the like 3. Unit 1 includes a propeller 4 carried on a generally horizontal shaft 5, which in turn is connected through a generally vertical drive shaft 6 to a generally horizontal shaft 7. An inboard engine 8 is disposed forwardly of the transom within the boat and includes a drive shaft 9 connected through a double universal joint 10 to shaft 7.

Stern drive unit 1 is supported from the transom by a transom plate assembly including opposed inner and outer plates 11 and 12 respectively which overlie the transom drive shaft opening and are secured together by suitable means, such as bolts 13. Means are provided, as in the above-identified co-pending application, to establish proper alignment of engine drive shaft 9 relative to the transom plate assembly.

Inner plate 11 of the transom plate assembly includes a pair of transversely spaced forwardly extending arms 14 and 15 which are disposed generally equidistantly on opposite sides of drive shaft 7 and whose upper surfaces define a horizontal plane adapted to support the rear end of engine 8 at two points. For this purpose, the rear engine flywheel housing 16 is provided with a pair of transversely spaced bores through which a pair of tubular resilient mounts 17 are received. The details of mount 17 are disclosed in the above-identified co-pending application.

With the installation of mounts 17 on transom plate arms 14 and 15, the rear of engine 8 will be correctly restrained vertically transversely and longitudinally relative to the transom plate assembly. Engine 8 will also be restrained thereby with respect to rotation about the vertical and longitudinal axes intersecting midway between and on a line joining the geometric centers of rear mounts 17.

The centraly located single forward engine support provides additional restraint with respect to rotation of the engine about the transverse axis passing through the geometric centers of mounts 17, to properly align the engine. For this purpose, a bracket 18 is secured forwardly of the engine and is provided with a downwardly opening bore recess 19, the axis of which is disposed generally in the vertical plane containing the axis of engine drive shaft 9. A tubular mount 20 extends through bore 19 and substantially on the roll axis of the engine, as more fully described in the above-identified co-pending application, and is supported on a vertical stud 21 which extends downwardly through the mount and through the forward end portion of a tubular engine support 22.

Mount 20 rests on a spacer 23 of suitable height and which is welded or otherwise fixedly secured to the top surface of support 23. A nut 24 or other suitable member is fixedly mounted on the upper end of stud 21.

In accordance with the invention, the front of engine 8 is mounted to and supported by transom 2, which is disposed rearwardly of the engine. For this purpose, support 22 is independent from mounts 17, is generally U-shaped, and comprises a pair of generally parallel longitudinal arms 25 which are spaced equidistantly transversely of drive shaft 9 and which are secured at their rearward ends to transom 2 as by bolts 26. Arms 25 are disposed below the major portion of engine 8 near the boat floor, and extend generally parallel to the floor. The forward end portions of arms 25 merge inwardly and upwardly into the transverse forward end portion 27 to which stud 21 is secured. Support 22 is disposed below the engine roll axis.

Proper alignment of engine 8, as indicated above, may be accomplished by proper vertical positioning of the rear ends of the support arms at the transom and/or by varying the height of spacer 23.

Arms 25 are rigidly secured against vertical and transverse horizontal vibratory forces by a generally U-shaped tubular brace 28 which preferably acts as a stirrup for the support. Brace 28 also includes a pair of generally parallel arms 29 which are spaced equidistantly transversely of drive shaft 9 and which are secured at their rearward ends to transom 2, as by bolts 30, substantially above and in the same vertical plane as the rearward ends of support 22 and above the longitudinal engine roll axis. Arms 29 extend diagonally downwardly to below the engine roll axis and pass to the outside of support 22, and merge into a connecting transverse forward end bar 31 which passes beneath end portion 27 of support 22 and is secured thereto, as by welding. As can be seen in FIGURE 1, the center of portion 27 connected to stud 21 is generally above bar 31.

Support 22 thus is cradled within stirrup-like brace 28 and is under compression stress from the weight of engine 8, while brace 28 is under tension stress. The amount of such stresses will vary during engine operation when vibratory forces are present. Mount 20 and the forward portion of the engine are thereby effectively restrained against movement, such as in the vertical direction.

The invention provides a novel support for the inboard engine of an inboard-outboard watercraft drive system, wherein the engine is entirely supported by the transom. In the embodiment shown in the drawings, the single central front engine support extends back to the transom outboardly of the rear mounts and eliminates the need for a floor support forward of the transom, facilitating access to the engine underside.

Although only a single front engine support is shown, more than one front mount may be utilized without departing from the spirit of the invention, as when heavier and more powerful inboard engines are used.

Various modes of carrying out the invention are contemplated as being within the scope of the following claims particularly pointing out and distinctly claiming the subject matter which is regarded as the invention.

I claim:

1. In an inboard-outboard drive for watercraft having a transom:
    (a) an outboard propulsion unit supported on the said transom,
    (b) an engine disposed inboard of the watercraft and forwardly of the said transom and drivingly connected to said propulsion unit by a drive shaft,
    (c) and engine support means secured to said transom, said support means comprising:
        (1) a first support member secured to said transom and extending forwardly to adjacent the rear of said engine,
        (2) a pair of transversely spaced and aligned resilient mounts supporting the rear of said engine on said first support member on opposite sides of said shaft,
        (3) a second support member of generally U-shaped configuration having transversely spaced generally parallel arms secured at their rear ends to the transom generally below the major portion of the engine and merging into a transverse forward end portion disposed beneath the front end of the engine,
        (4) a diagonal brace of generally U-shaped configuration having transversely spaced generally parallel arms secured at their rear ends to the transom and merging into a transverse front bar,
        (5) said bar engaging said transverse forward end portion of said second support member for bracing the latter,
        (6) and at least one resilient engine mount secured to said transverse forward end portion and providing a front engine support.

2. In an inboard-outboard drive for watercraft having a transom:
    (a) an outboard propulsion unit supported on the said transom,
    (b) an engine disposed inboard of the watercraft and forwardly of said transom and drivingly connected to said propulsion unit by a drive shaft,
    (c) said engine having a longitudinal roll axis extending through the center of gravity thereof,
    (d) and a three-point engine support means secured to said transom, said support means comprising:
        (1) a first support member secured to said transom and extending forwardly to adjacent the rear of said engine,
        (2) a pair of resilient mounts supporting the rear of said engine on said first support member, said mounts being transversely spaced and aligned on opposite sides of said drive shaft,
        (3) a second support member of generally U-shaped configuration having generally parallel arms equidistantly and transversely spaced to each side of said shaft and secured at their rear ends to the transom, said arms extending forwardly adjacent the floor of the watercraft and generally in parallelism therewith,
        (4) said arms merging upwardly into a transverse forward end portion,
        (5) a stirrup of generally U-shaped configuration having generally parallel arms equidistantly and transevrsely spaced to each side of said shaft and secured at their rear ends to the transom above the said roll axis of said engine and in the same vertical plane as the rear ends of said transverse forward end portion, said stirrup arms extending diagonally downwardly and forwardly on each side of said engine,
        (6) said stirrup arms merging into a transverse bar disposed below the roll axis of said engine and with the stirrup positioned to cradle said second support member therewithin.
        (7) and a resilient engine mount secured to the central portion of said transverse forward end portion of said second support member and providing a single front engine support,
        (8) the weight of said engine causing the arms of said second support member to be in compression and causing the arms of said stirrup to be in tension.

3. In an inboard-outboard drive for watercraft having a transom:
    (a) an outboard propulsion unit carried by said transom,
    (b) an engine disposed inboard of the watercraft and forwardly of the said transom and drivingly connected to said propulsion unit by a drive shaft,
    (c) rear support means secured to the transom and supporting said engine at two points on opposite sides of said shaft,
    (d) and front support means secured to the transom extending forwardly to the front of the engine and supporting the latter at at least one point thereof, said front support means comprising:
        (1) a support member of generally U-shaped configuration having transversely spaced generally parallel arms secured at their rear ends to the transom and extending forwardly adjacent the floor of the watercraft and generally in parallelism therewith,
        (2) said arms merging into a transverse forward end portion,
        (3) a stirrup of general U-shaped configuration having transversely spaced generally parallel arms secured at their rear ends to the transom above said support member and extending diagonally downwardly in a forward direction, (4) said stirrup arms merging into a transverse bar with the stirrup positioned so that said support member is cradled within said stirrup, (5) means securing said support member to said stirrup, (6) and a resilient engine mount secured to the central portion of the transverse forward end portion of said support member and providing a front engine support.

4. In an inboard-outboard drive for watercraft having a transom:

(a) an outboard propulsion unit carried by said transom, (b) an engine disposed inboard of the watercraft and forwardly of the said transom and drivingly connected to said propulsion unit by a drive shaft, (c) rear support means carried by the transom and supporting the rear end portion of said engine at two points on opposite sides of said shaft, (d) and front support means independent from said rear support means and carried by the transom and extending forwardly to the front of the engine and supporting the front end portion of the latter at at least one point thereof and free of the floor of the watercraft.

References Cited by the Examiner

UNITED STATES PATENTS

| 3,083,741 | 4/1963 | Conover | 115—34 |
| 3,128,741 | 4/1964 | Benjamen | 115—34 |
| 3,175,530 | 3/1965 | Petterson | 114—41 |

FOREIGN PATENTS 530,385   12/1940   Great Britain.

MILTON BUCHLER, *Primary Examiner.*

FERGUS S. MIDDLETON, R. G. BESHBA,
*Assistant Examiners.*